United States Patent
Nishimura et al.

(10) Patent No.: US 8,538,633 B2
(45) Date of Patent: Sep. 17, 2013

(54) POWER STEERING APPARATUS

(75) Inventors: Hiroshi Nishimura, Chiyoda-ku (JP);
Motohiro Norikawa, Chiyoda-ku (JP);
Akira Ejiri, Kobe (JP)

(73) Assignee: Mitsubishi Electric Corporation, Tokyo (JP)

( * ) Notice: Subject to any disclaimer, the term of this patent is extended or adjusted under 35 U.S.C. 154(b) by 333 days.

(21) Appl. No.: 12/942,810

(22) Filed: Nov. 9, 2010

(65) Prior Publication Data

US 2011/0257843 A1 Oct. 20, 2011

(30) Foreign Application Priority Data

Apr. 16, 2010 (JP) ................... 2010-094954

(51) Int. Cl.
*B62D 5/00* (2006.01)
*B62D 15/00* (2006.01)
*B62D 6/00* (2006.01)
*G06F 17/00* (2006.01)

(52) U.S. Cl.
USPC ............ 701/41; 701/43; 180/53.5; 180/53.8; 180/422

(58) Field of Classification Search
USPC ................... 701/36, 41, 43, 29.1, 29.2, 29.7, 701/31.6; 307/9.1, 10.1; 340/438, 439; 180/53.1, 53.4, 53.5, 53.8, 400, 403, 404, 180/421, 422, 428, 443, 446
See application file for complete search history.

(56) References Cited

U.S. PATENT DOCUMENTS

| | | | | |
|---|---|---|---|---|
| 4,862,366 A | * | 8/1989 | Morishita et al. | 701/43 |
| 5,761,627 A | * | 6/1998 | Seidel et al. | 701/41 |
| 6,052,633 A | * | 4/2000 | Fukuyama et al. | 701/41 |

FOREIGN PATENT DOCUMENTS

| | | |
|---|---|---|
| JP | 3652142 B2 | 5/2000 |
| JP | 4178218 B2 | 8/2004 |

* cited by examiner

*Primary Examiner* — Thomas Tarcza
*Assistant Examiner* — Edward Pipala
(74) *Attorney, Agent, or Firm* — Sughrue Mion, PLLC (57) ABSTRACT

The power steering apparatus according to the invention is a power steering apparatus with a power steering function to drive an oil pump by a motor to generate hydraulic pressure, and to assist in driver's steering through the hydraulic pressure. The power steering apparatus includes a power source voltage detecting unit which detects the voltage of a power source of the power steering apparatus; a motor rotating speed detecting unit which detects the rotating speed of the motor; and a control stopping unit which stops the power steering function when the voltage of the power source detected by the power source voltage detecting unit exceeds a predetermined power source voltage value, and the rotating speed of the motor detected by the motor rotating speed detecting unit is equal to or less than a predetermined motor rotating speed value.

8 Claims, 7 Drawing Sheets

FIG.4A
MOTOR ROTATING SPEED M_RPM

FIG.4B
POWER SOURCE VOLTAGE VB

FIG.4C
DETERMINATION OF FAILURE OF POWER STEERING APPARATUS

POWER STEERING APPARATUS

BACKGROUND OF THE INVENTION

1. Field of the Invention

The present invention relates to a power steering apparatus, and particularly, to a power steering apparatus which drives an oil pump by a motor to generate hydraulic pressure and assists in driver's steering through the generated hydraulic pressure.

2. Description of the Related Art

Conventionally, in a power steering apparatus which drives an oil pump by a motor to generate hydraulic pressure and assists in driver's steering through the generated hydraulic pressure, the technique of stopping a power steering function regardless of the voltage of a power source to be applied to a motor in a case where the rotating speed of the motor is equal to or less than a predetermined value is disclosed (for example, refer to Japanese Patent No. 3652142 (particularly, the description related to Claim 3)).

According to the conventional power steering apparatus disclosed in Japanese Patent No. 3652142, a fail safe function can be exerted by stopping the power steering function in a case where it is detected that the rotating speed of the motor is equal to or less than a predetermined value, for example, when a system is started.

Generally, when the voltage of a battery which is a power source of a power steering apparatus decreases, an electric current which flows into the motor decreases due to wiring resistance, the internal resistance of a circuit, or the like. Since the output torque of the motor is proportional to the electric current which flows into the motor, the output torque of the motor is reduced due to a decrease in the voltage of the battery, and the rotating speed of the oil pump decreases.

According to the conventional power steering apparatus disclosed in Japanese Patent No. 3652142, the power steering function is stopped regardless of the voltage of the power source to be applied to the motor in a case where the rotating speed of the motor is equal to or less than a predetermined value. Thus, it was necessary to take measures such that the power steering apparatus is not allowed to operate under the condition that a decrease in the power source voltage of the power steering apparatus is apt to occur, for example, when an engine is started.

SUMMARY OF THE INVENTION

The invention has been made in order to solve the above problems in the conventional apparatus, and the object of the invention is to provide a power steering apparatus capable of continuing a power steering function even if the voltage of a power source decreases and the rotating speed of a motor decreases.

The power steering apparatus according to the invention is a power steering apparatus with a power steering function to drive an oil pump by a motor to generate hydraulic pressure, and to assist in driver's steering through the hydraulic pressure. The power steering apparatus includes a power source voltage detecting unit which detects the voltage of a power source of the power steering apparatus; a motor rotating speed detecting unit which detects the rotating speed of the motor; and a control stopping unit which stops the power steering function when the voltage of the power source detected by the power source voltage detecting unit exceeds a predetermined power source voltage value, and the rotating speed of the motor detected by the motor rotating speed detecting unit is equal to or less than a predetermined motor rotating speed value.

The power steering apparatus according to the invention is a power steering apparatus with a power steering function to drive an oil pump by a motor to generate hydraulic pressure, and to assist in driver's steering through the hydraulic pressure. The power steering apparatus includes a power source voltage detecting unit which detects the voltage of a power source of the power steering apparatus; a motor rotating speed detecting unit which detects the rotating speed of the motor; and a control stopping unit which recognizes that the voltage of the power source is in a normal range when the voltage of the power source detected by the power source voltage detecting unit exceeds the predetermined power source voltage value, and recognizes that the voltage of the power source is in a decrease state range when the voltage of the power source is equal to or less than the predetermined power source voltage value; recognizes that the motor rotating speed is in a normal range when the rotating speed of the motor detected by the motor rotating speed detecting unit exceeds the predetermined motor rotating speed value, and recognizes that the motor rotating speed is in a decrease state range when the rotating speed of the motor is equal to or less than the predetermined motor rotating speed value; determines that the power steering apparatus fails when it is recognized that the power source voltage is in the normal range, and the motor rotating speed is in the decrease state range; and stops the power steering function when the determination lasts for a predetermined time.

The power steering apparatus according to the invention includes a power source voltage detecting unit which detects the voltage of a power source of the power steering apparatus, a motor rotating speed detecting unit which detects the rotating speed of the motor, and a control stopping unit which stops the power steering function when the voltage of the power source detected by the power source voltage detecting unit exceeds a predetermined power source voltage value, and the rotating speed of the motor detected by the motor rotating speed detecting unit is equal to or less than a predetermined motor rotating speed value. Thus, the following advantages are exhibited. That is, it is possible to continue the power steering function even if the voltage of the power source decreases and the rotating speed of the motor decreases. It is not necessary to take measures such that the operation of the power steering apparatus is stopped even under the condition that a decrease in the power source voltage of the power steering apparatus is apt to occur, for example, even when an engine is started. Moreover, the power steering function can be stopped when the rotating speed of the motor detected by the motor rotating speed detecting unit is equal to or less than a predetermined motor rotating speed value.

The power steering apparatus according to the invention includes a control stopping unit which recognizes that the voltage of the power source is in a normal range when the voltage of the power source detected by the power source voltage detecting unit exceeds the predetermined power source voltage value, and recognizes that the voltage of the power source is in a decrease state range when the voltage of the power source is equal to or less than the predetermined power source voltage value; recognizes that the motor rotating speed is in a normal range when the rotating speed of the motor detected by the motor rotating speed detecting unit exceeds the predetermined motor rotating speed value, and recognizes that the motor rotating speed is in a decrease state range when the rotating speed of the motor is equal to or less than the predetermined motor rotating speed value; determines that the power steering apparatus fails when it is recognized that the power source voltage is in the normal range, and the motor rotating speed is in the decrease state range; and stops the power steering function when the determination lasts for a predetermined time. That is, it is possible to continue the power steering function even if the voltage of the power source decreases and the rotating speed of the motor decreases. It is not necessary to take measures such that the operation of the power steering apparatus is stopped even under the condition that a decrease in the power source voltage of the power steering apparatus is apt to occur, for example, even when an engine is started. Moreover, the power steering function can be effectively stopped when the rotating speed of the motor detected by the motor rotating speed detecting unit is equal to or less than a predetermined motor rotating speed value.

The foregoing and other objects, features, aspects, and advantages of the present invention will become more apparent from the following detailed description of the present invention when taken in conjunction with the accompanying drawings.

DESCRIPTION OF PREFERRED EMBODIMENT

Embodiment 1

Figure 1:
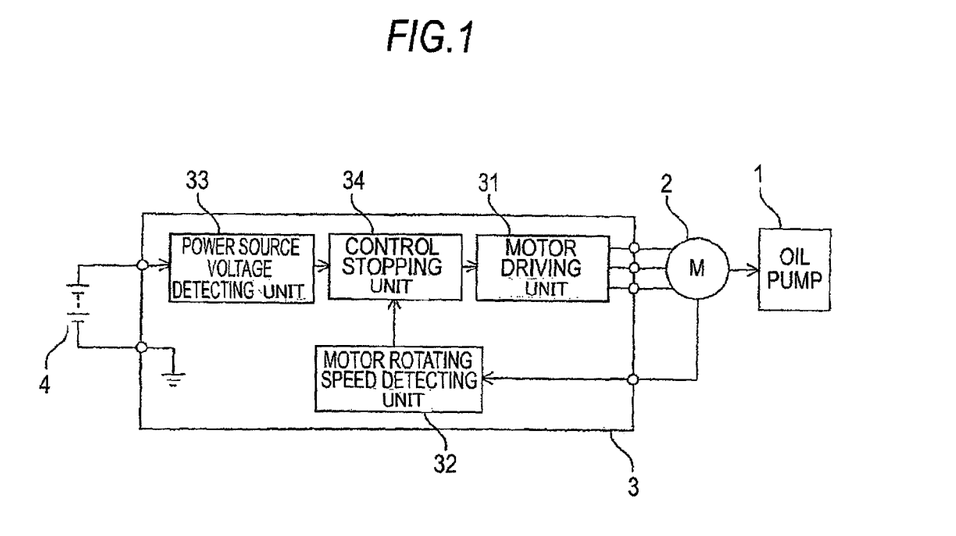
FIG. 1 is a control block diagram of a power steering apparatus according to Embodiment 1 of this invention.

FIG. 1 is a control block diagram of a power steering apparatus according to Embodiment 1 of this invention. In FIG. 1, an oil pump 1 provided in the power steering apparatus is driven by a motor 2 provided in the power steering apparatus to generate hydraulic pressure. The power steering apparatus assists in driver's steering through the hydraulic pressure generated by the oil pump 1. The motor 2 is controlled by a power steering control unit 3. A battery 4 serving as a power source supplies a power source to the motor 2 via an ECU 3.

The power steering control unit 3 has therein a motor driving unit 31 which outputs a signal which drives the motor 2, a motor rotating speed detecting unit 32 which detects the rotating speed of the motor 2, a power source voltage detecting unit 33 which detects the output voltage of the battery 4 used as a power source of the power steering control unit 3, and a control stopping unit 34 which stops the operation of the motor driving unit 31 when the failure of the electric power steering apparatus has been determined. The determination of the failure of electric power steering by the control stopping unit 34 will be described later. Here, the motor rotating speed detected by the motor rotating speed detecting unit 32 is defined as M_RPM, and the power source voltage detected by the power source voltage detecting unit 33 is defined as VB.

Figure 2:
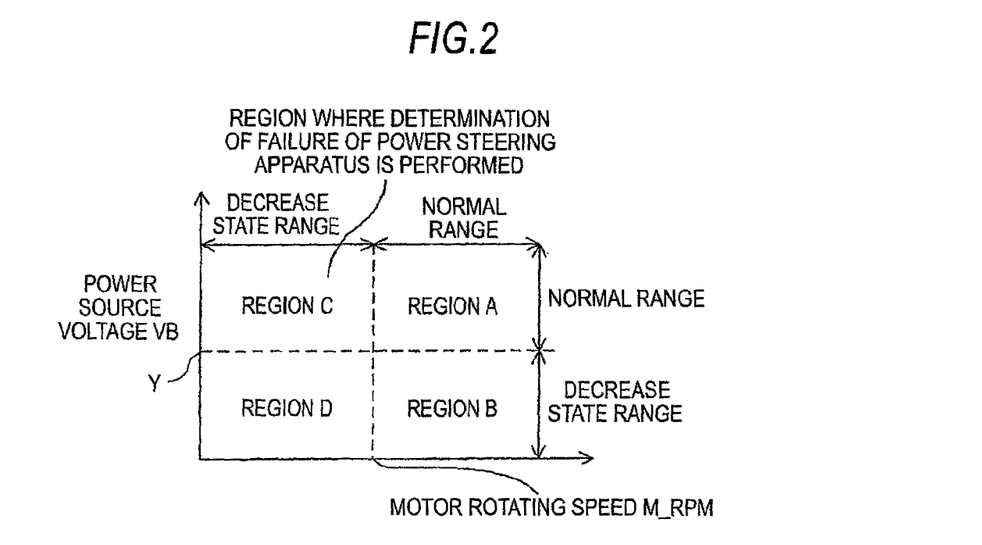
FIG. 2 is an explanatory view showing the relationship between motor rotating speed and power source voltage in the power steering apparatus according to Embodiment 1 of this invention.

FIG. 2 is an explanatory view showing the relationship between the motor rotating speed and the power source voltage in the power steering apparatus according to Embodiment 1 of this invention. Here, the horizontal axis represents the motor rotating speed M_RPM, and the vertical axis represents the power source voltage VB. In FIG. 2, the motor rotating speed M_RPM is recognized by the control stopping unit 34, with a range until the motor rotating speed reaches a predetermined value X as a decrease state range and a range of the predetermined value X or more as a normal range. Additionally, the power source voltage VB is recognized by the control stopping unit 34, with a range until the power source voltage reaches a predetermined value Y as a decrease state range and a range of the predetermined value Y or more as a normal range. In addition, the predetermined value X of the motor rotation number and the predetermined value Y of the power source voltage can be arbitrarily set, respectively.

The control stopping unit 34 recognizes the motor rotating speed M_RPM and the power source voltage VB as mentioned above, respectively, and determines a region where both of the motor rotating speed M_RPM and the power source voltage VB are in the normal ranges as a "Region A", a region where the motor rotating speed M_RPM is in the normal range and the power source voltage VB is in the decrease state range as a "Region B", a region where the motor rotating speed M_RPM is in the decrease state range and the power source voltage VB is in the normal range as a "Region C", and a region where both of the motor rotating speed M_RPM and the power source voltage VB are in the decrease state ranges as a "Region D", respectively.

Here, the region that the control stopping unit 34 has determined from the relationship between the motor rotating speed M_RPM and the power source voltage VB is defined as a region determination result R1. The control stopping unit 34 performs the failure determination that the electric power steering apparatus fails when the region determination result R1 is "Region C." Then, when the period during which the region determination result R1 is "Region C" has lasted for a predetermined time T_FAIL, the control stopping unit 34 settles the determination of the "Failure" of the power steering apparatus, and stops a power steering function.

Figure 3A:
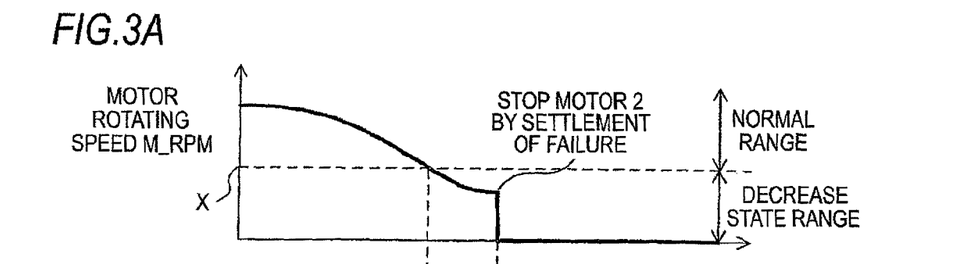
FIGS. 3A to 3C are explanatory views showing the operation when the power source voltage does not decrease and the motor rotating speed has decreased in the power steering apparatus according to Embodiment 1 of this invention.
Figure 3B:
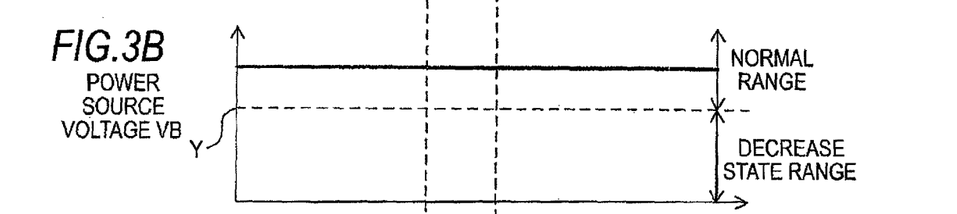
Figure 3C:
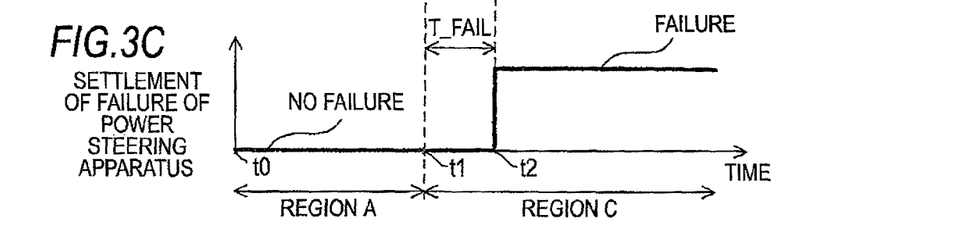

Next, the operation of the power steering apparatus according to Embodiment 1 of this invention will be described. First, the operation when the power source voltage VB does not decrease, and the motor rotating speed M_RPM has decreased will be described. FIGS. 3A to 3C are explanatory views showing the operation when the power source voltage does not decrease and the motor rotating speed has decreased in the power steering apparatus according to Embodiment 1 of this invention. Here, FIG. 3A shows the motor rotating speed M_RPM, FIG. 3B shows the power source voltage VB, and FIG. 3C shows a situation of settlement of the failure of the power steering apparatus. Additionally, FIGS. 3A to 3C show a state where the power steering apparatus starts and the motor driving unit 31 drives the motor 2, as a starting point. As mentioned above, the power source voltage VB shown in FIG. 3A exceeds the predetermined value Y throughout an entire period, for example, is kept at a rated voltage of 12 [V] and is in the normal range.

In FIGS. 3A to 3C, the motor rotating speed M_RPM exceeds the predetermined value X from a time t0 which is a starting point to a time t1. Accordingly, both the motor rotating speed M_RPM and the power source voltage VB are in the normal ranges. Therefore, the region determination result R1 in the control stopping unit 34 becomes the aforementioned "Region A." Next, when the time t1 has been exceeded, supposing the motor rotating speed M_RPM becomes equal to or less than the predetermined value X and falls into the decrease state range, the region determination result R1 in the control stopping unit 34 becomes "Region C" from "Region A." At this time, the control stopping unit 34 performs the failure determination that the electric power steering apparatus fails.

Next, the control stopping unit 34 measures the period during which the determination result of "Region C" lasts from the time t1 when the region determination result R1 has become "Region C", settles failure determination as shown in FIG. 3C at a time t2 when the measured period has reached the predetermined time T_FAIL or more, and stops the operation of the motor driving unit 31 to stop the rotation of the motor 2. Thereby, the generation of the hydraulic pressure from the oil pump 1 disappears, and the power steering function of the power steering apparatus stops.

Figure 4A:
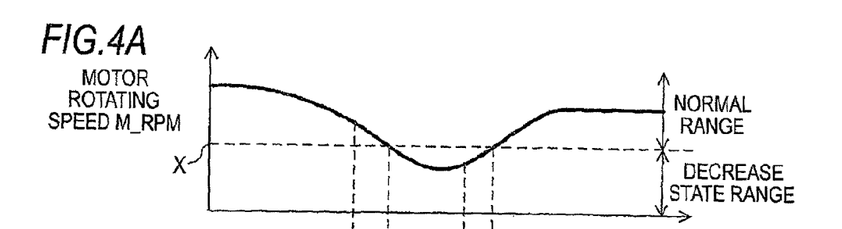
FIGS. 4A to 4C are explanatory views showing the operation when the motor rotating speed and the power source voltage have decreased, in the power steering apparatus according to Embodiment 1 of this invention.
Figure 4B:
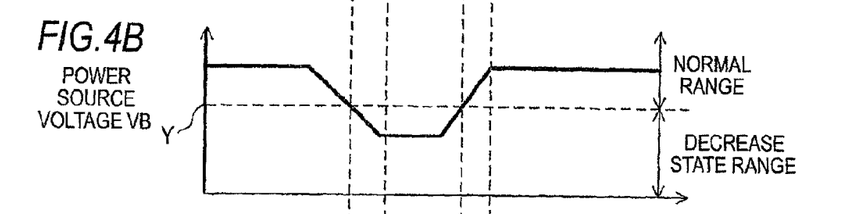
Figure 4C:
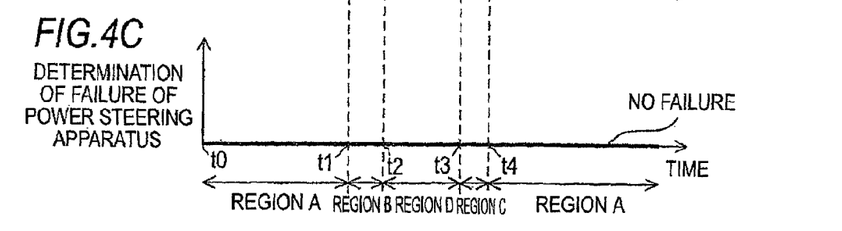

Although the operation of the power steering apparatus when the power source voltage VB does not decrease and the motor rotating speed M_RPM has decreased has been described hitherto, the operation of the electric power steering apparatus when both of the power source voltage VB and the motor rotating speed M_RPM have decreased will next be described. FIGS. 4A to 4C are explanatory views showing the operation when the power source voltage and the motor rotating speed have decreased in the power steering apparatus according to Embodiment 1 of this invention. Here, FIG. 4A shows the motor rotating speed M_RPM, FIG. 4B shows the power source voltage VB, and FIG. 4C shows a situation of determination of the failure of the power steering apparatus. Additionally, FIGS. 4A to 4C show a state where the power steering apparatus starts and the motor driving unit 31 drives the motor 2, as a starting point.

In FIGS. 4A to 4C, the motor rotating speed M_RPM exceeds the predetermined value X from a time t0 which is a starting point to a time t1. Additionally, although the power source voltage VB is a rated voltage, for example, 12 [V], and is in the normal range at the time t0, the power source voltage decreases from the rated voltage due to a certain factor immediately prior to the time t1, and becomes the predetermined value Y or less and falls into the decrease state range at the time t1. Accordingly, since both the motor rotating speed M_RPM and the power source voltage VB are in the normal ranges from the time t0 to the time t1, the region determination result R1 in the control stopping unit 34 becomes "Region A."

At the time t1, the power source voltage VB becomes the predetermined value Y or less and falls into the decrease state range, but the motor rotating speed M_RPM exceeds the predetermined value X, and is in the normal range. Then, the motor rotating speed M_RPM continues to be in the normal range from the time t1 to a time t2. On the other hand, the power source voltage VB continues to be in the decrease state range from the time t1 to the time t2. Accordingly, the region determination result R1 of the control stopping unit 34 from the time t1 to the time t2 becomes "Region B."

Next, when the time t2 is reached, the motor rotating speed M_RPM becomes the predetermined value X or less, and falls into the decrease state range. Additionally, even if the time t2 is reached, the power source voltage VB still continues to be in the decrease state range. When a time t3 is reached, the power source voltage VB exceeds the predetermined value Y and returns to the normal range, but the motor rotating speed M_RPM is still in the decrease state range. Accordingly, the region determination result R1 of the control stopping unit 34 becomes "Region D" from the time t2 to the time t3. Even when the region determination result R1 by the control stopping unit 34 is in "Region D", the motor 2 continues to be driven by the motor driving unit 31 although the motor rotating speed M_RPM is also in the decrease state with a decrease in the power source voltage VB.

When the time t3 is reached, the power source voltage VB exceeds the predetermined value Y and returns to the normal range, and the power source voltage returns to the rated voltage, for example, 12 [V], at a time t4. On the other hand, the motor rotating speed M_RPM increases with an increase of the power source voltage VB, exceeds the predetermined value X and falls into the normal range at the time t4, and becomes a constant rotating speed after the time t4. As a result, the region determination result R1 of the control stopping unit 34 becomes "Region C" from the time t3 to the time t4.

As mentioned above, the control stopping unit 34 measures the period during which the region determination result R1 of "Region C" lasts from the time t3 when the determination result becomes "Region C." However, the period from the time t3 to the time t4 is less than the predetermined time T_FAIL. Accordingly, the determination of the "Failure" of the power steering apparatus is not settled. Accordingly, as shown in FIG. 4C, the failure determination of the power steering apparatus by the control stopping unit 34 remains "No Failure."

After the time t4, both the motor rotating speed M_RPM and the power source voltage VB are in the normal ranges, and the region determination result R1 by the control stopping unit 34 becomes "Region A."

In addition, in order not to settle the failure of the power steering apparatus settled during starting of the motor 2, the aforementioned predetermined time T_FAIL may be set to a larger value than the period until the motor rotating speed M_RPM reaches the normal range from "0" when the motor 2 has been driven with the power source voltage VB being in the normal range.

Additionally, in the aforementioned description, the control stopping unit 34 performs the determination of the normal range and decrease state range of the power source voltage VB and motor rotating speed M_RPM, on the basis of the constant predetermined value Y and the constant predetermined value X, respectively. However, a hysteresis may be given to the respective predetermined values Y and X so that chattering does not occur before or after the determination.

Embodiment 2

Next, the power steering apparatus according to Embodiment 2 of this invention will be described. In the aforementioned Embodiment 1, when the region determination result R1 by the control stopping unit is in "Region D", driving of the motor 2 is continued while the motor rotating speed M_RPM is also in the decrease state with a decrease in the power source voltage VB. However, in Embodiment 2, when the region determination result R1 by the control stopping unit is in "Region D", the control of reducing the output of the motor 2 is performed.

Figure 5:
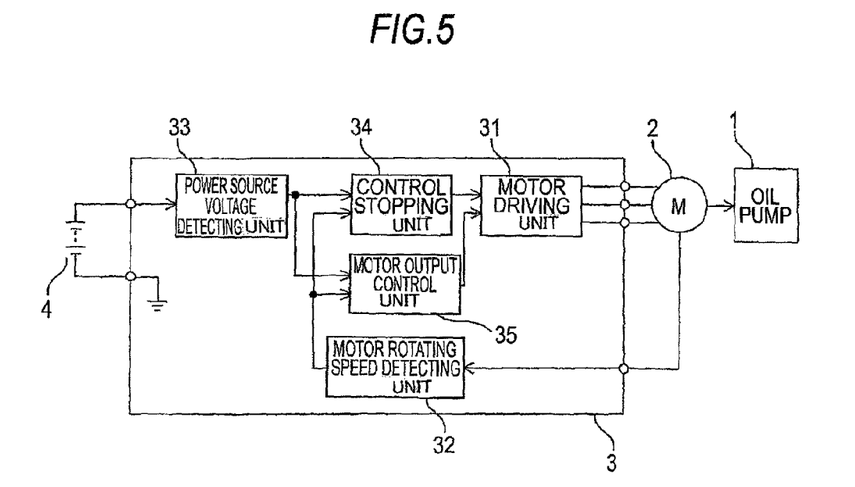
FIG. 5 is a control block diagram of a power steering apparatus according to Embodiment 2 of this invention.

FIG. 5 is a control block diagram of the power steering apparatus according to Embodiment 2 of this invention. In FIG. 5, a motor output control unit 35 controls the motor driving unit 31 so as to reduce the rotating speed of the motor 2 as will be described later, on the basis of the power source voltage VB detected by the power source voltage detecting unit 33 and the motor rotating speed M_RPM detected by the motor rotating speed detecting unit 32. The other configurations are the same as those of Embodiment 1.

Figure 6:
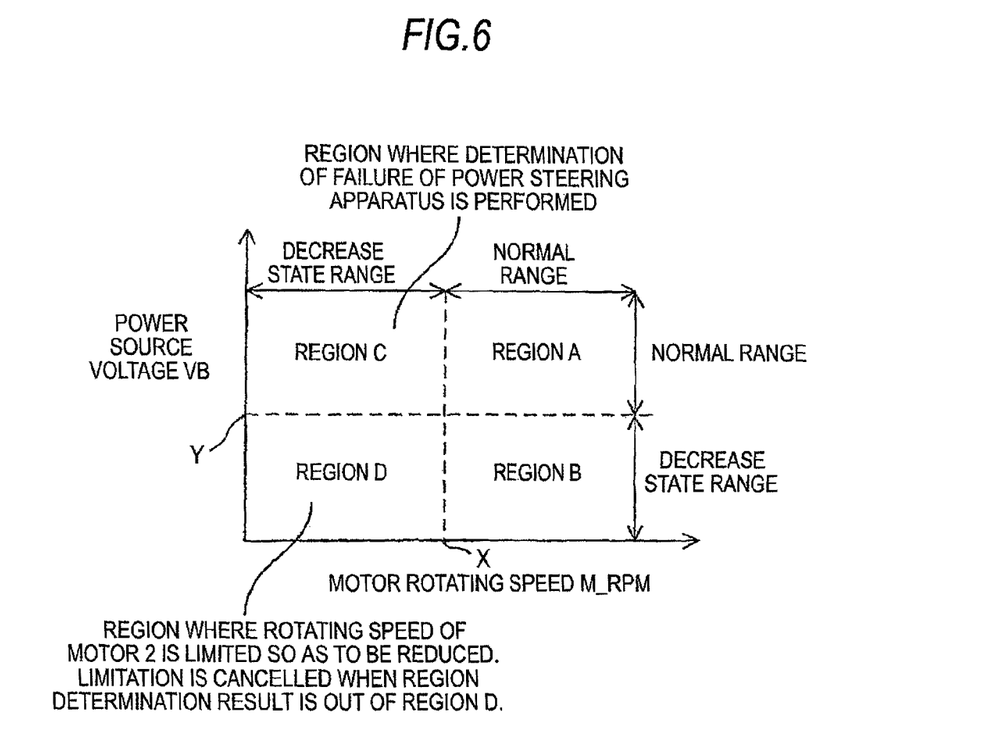
FIG. 6 is an explanatory view showing the relationship between motor rotating speed and power source voltage in the power steering apparatus according to Embodiment 2 of this invention.

FIG. 6 is an explanatory view showing the relationship between the motor rotating speed and the power source voltage in the power steering apparatus according to Embodiment 2 of this invention. Here, the horizontal axis represents the motor rotating speed M_RPM, and the vertical axis represents the power source voltage VB. In FIG. 6, the motor rotating speed M_RPM is recognized by the control stopping unit 34 and the motor output control unit 35, with a range until the motor rotating speed reaches a constant predetermined value X as a decrease state range and a range of the predetermined value X or higher as a normal range. Additionally, the power source voltage VB is recognized by the control stopping unit 34 and the motor output control unit 35, with a range until the power source voltage reaches a constant predetermined value Y as a decrease state range and a range of the predetermined value Y or higher as a normal range. In addition, the predetermined value X of the motor rotation number and the predetermined value Y of the power source voltage can be arbitrarily set, respectively.

The control stopping unit 34 recognizes the motor rotating speed M_RPM and the power source voltage VB as mentioned above, respectively, and determines a region where both of the motor rotating speed M_RPM and the power source voltage VB are in the normal ranges as a "Region A", a region where the motor rotating speed M_RPM is in the normal range and the power source voltage VB is in the decrease state range as a "Region B", a region where the motor rotating speed M_RPM is in the decrease state range and the power source voltage VB is in the normal range as a "Region C", and a region where both of the motor rotating speed M_RPM and the power source voltage VB are in the decrease state ranges as a "Region D", respectively.

Here, the control stopping unit 34 obtains a region determined from the relationship between the motor rotating speed M_RPM and the power source voltage VB as the region determination result R1. The control stopping unit 34 performs the failure determination that the electric power steering apparatus fails when the region determination result R1 is "Region C." Then, when the time during which the region determination result R1 is "Region C" has lasted for a predetermined time T_FAIL, the control stopping unit 34 settles the determination of the "Failure" of the power steering apparatus, and stops a power steering function.

Additionally, the motor output control unit 35 recognizes the normal ranges and the decrease state ranges as shown in FIG. 6 on the basis of the constant predetermined value X and the constant predetermined value Y, respectively, with respect to the motor rotating speed M_RPM and the power source voltage VB, similarly to the control stopping unit 34. Here, similarly to the control stopping unit 34, the motor output control unit 35 obtains a region determined from the relationship between the motor rotating speed M_RPM and the power source voltage VB as the region determination result R1.

The motor output control unit 35 recognizes the motor rotating speed M_RPM and the power source voltage VB as mentioned above, respectively, and similarly to the aforementioned control stopping unit 34, determines a region where both of the motor rotating speed M_RPM and the power source voltage VB are in the normal ranges as a "Region A", a region where the motor rotating speed M_RPM is in the normal range and the power source voltage VB is in the decrease state range as a "Region B", a region where the motor rotating speed M_RPM is in the decrease state range and the power source voltage VB is in the normal range as a "Region C", and a region where both of the motor rotating speed M_RPM and the power source voltage VB are in the decrease state ranges as a "Region D", respectively. The motor output control unit 35 controls the motor driving unit 31 so as to reduce the rotating speed of the motor 2, when the region determination result R1 is in "Region D" as will be described later.

Next, the operation of the power steering apparatus according to Embodiment 2 of this invention will be described. Since the operation when the power source voltage VB does not decrease, and the motor rotating speed M_RPM has decreased is the same as that of the FIG. 3 in the aforementioned Embodiment 1, the description thereof is omitted.

Figure 7A:
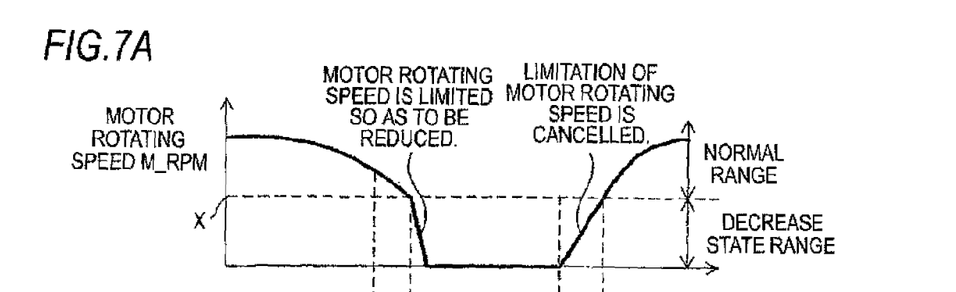
FIGS. 7A to 7C are explanatory views showing the operation when the motor rotating speed and the power source voltage have decreased in the power steering apparatus according to Embodiment 2 of this invention.
Figure 7B:
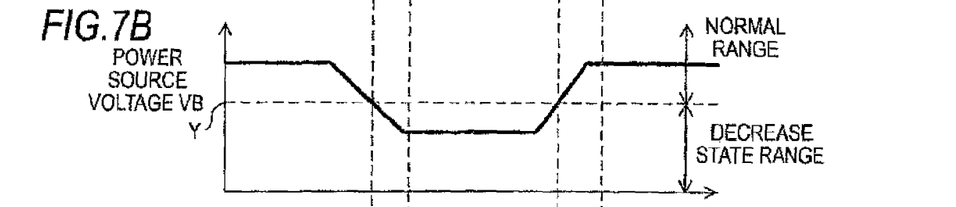
Figure 7C:
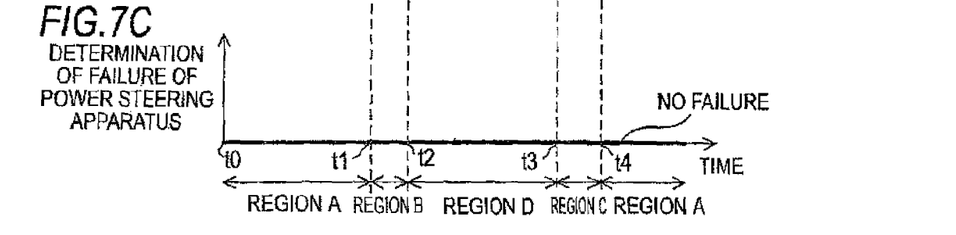

FIGS. 7A to 7C are explanatory views showing the operation when the power source voltage and the motor rotating speed have decreased in the power steering apparatus according to Embodiment 2 of this invention. Here, FIG. 4A shows the motor rotating speed M_RPM, FIG. 4B shows the power source voltage VB, and FIG. 4C shows a situation of the determination of the failure of the power steering apparatus. Additionally, FIGS. 7A to 7C show a state where the power steering apparatus starts and the motor driving unit 31 drives the motor 2, as a starting point.

In FIGS. 7A to 7C, the motor rotating speed M_RPM exceeds the predetermined value X from a time t0 which is a starting point to a time t1. Additionally, although the power source voltage VB is a rated voltage, for example, 12 [V], and is in the normal range at the time t0, the power source voltage decreases from the rated voltage due to a certain factor immediately prior to the time t1, and becomes the predetermined value Y or less and falls into the decrease state range at the time t1. Accordingly, since both the motor rotating speed M_RPM and the power source voltage VB are in the normal ranges from the time t0 to the time t1, the region determination result R1 in the control stopping unit 34 and the motor output control unit 35 becomes "Region A."

At the time t1, the power source voltage VB becomes the predetermined value Y or less and falls into the decrease state range, but the motor rotating speed M_RPM exceeds the predetermined value X, and is in the normal range. Then, although the motor rotating speed M_RPM decreases gradually with a decrease of the power source voltage VB, the motor rotating speed continues to be in the normal range from the time t1 to a time t2. On the other hand, the power source voltage VB continues to be in the decrease state range from the time t1 to the time t2. Accordingly, the region determination result R1 of the control stopping unit 34 and the motor output control unit 35 from the time t1 to the time t2 becomes "Region B."

Next, when the time t2 is reached, the motor rotating speed M_RPM becomes the predetermined value X or less, and falls into the decrease state range. Additionally, even if the time t2 is reached, the power source voltage VB still continues to be in the decrease state range. Accordingly, the region determination result R1 of the control stopping unit 34 and the motor output control unit 35 from the time t2 to a time t3 becomes "Region D." As mentioned above, the motor output control unit 35 controls the motor driving unit 31 so as to reduce the rotating speed of the motor 2, when the region determination result R1 is in "Region D." Therefore, as shown in FIG. 7A, the motor 2 is controlled so that the motor rotating speed M_RPM is reduced by the motor driving unit 31 when the time t2 is reached, and the motor rotating speed becomes "0" after the elapse of the time t2. Thereafter, the motor rotating speed M_RPM remains "0" until the time t3 is reached.

The power source voltage VB increases gradually immediately before the time t3, and exceeds the predetermined value Y and returns to the normal range when the time t3 is reached, and the power source voltage returns to the rated voltage, for example, 12 [V], until a time t4 is reached. As a result, the region determination result R1 of the control stopping unit 34 and the motor output control unit 35 from the time t3 to the time t4 changes to "Region C" from "Region D." Thereby, the motor output control unit 35 controls the motor driving unit 31 so as to cancel the limitation of the motor rotating speed at the time t3. Accordingly, the motor rotating speed M-RPM increases gradually from the time t3, becomes the predetermined value X or more at the time t4, and returns to the normal range. The region determination result R1 of the control stopping unit 34 and the motor output control unit 35 becomes "Region C" from the time t3 to the time t4.

As mentioned above, the control stopping unit 34 measures the period during which the region determination result R1 of "Region C" lasts from the time t3 when the determination result becomes "Region C." However, the period from the time t3 to the time t4 is less than the predetermined time T_FAIL. Accordingly, the determination of the "Failure" of the power steering apparatus is not settled. Accordingly, as shown in FIG. 4C, the failure determination of the power steering apparatus by the control stopping unit 34 remains "No Failure."

After the time t4, both the motor rotating speed M_RPM and the power source voltage VB are in the normal ranges, and the region determination result R1 by the control stopping unit 34 and the motor output control unit 35 becomes "Region A." As the region determination result R1 becomes "Region A" from "Region C", it is possible to perform the normal operation of the power steering apparatus.

In addition, in order not to settle the failure of the power steering apparatus during starting of the motor 2, the aforementioned predetermined time T_FAIL may be set to a larger value than the period until the motor rotating speed M_RPM reaches the normal range from "0" when the motor 2 has been driven with the power source voltage VB being in the normal range.

Additionally, in the aforementioned description, the control stopping unit 34 performs the determination of the normal range and decrease state range of the power source voltage VB and motor rotating speed M_RPM, on the basis of the constant predetermined value Y and the constant predetermined value X, respectively. However, a hysteresis may be given to the respective predetermined values Y and X so that chattering does not occur before or after the determination.

Embodiment 3

Next, the power steering apparatus according to Embodiment 3 of this invention will be described. In the aforementioned Embodiment 2, when the region determination result R1 by the motor output control unit is "Region D", the motor rotating speed is limited so as to be reduced, and when the region determination result R1 is out of the state of Region D, the limitation which has reduced the rotating speed of the motor is cancelled. In Embodiment 3, however, the limitation of the rotating speed of the motor is cancelled using a signal input from an engine control unit (hereinafter referred to as an ECU).

Figure 8:
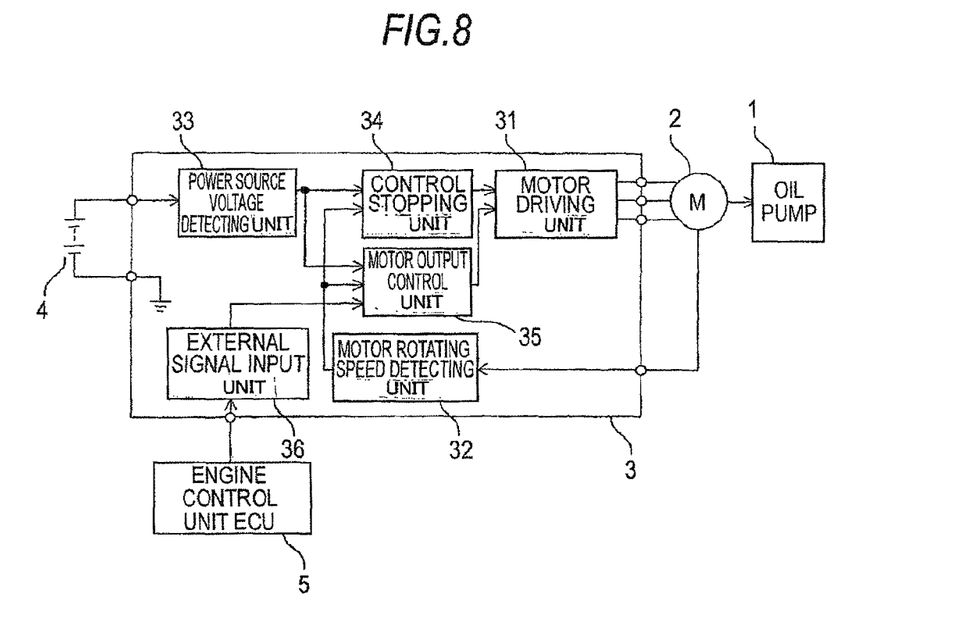
FIG. 8 is a control block diagram of a power steering apparatus according to Embodiment 3 of this invention.

FIG. 8 is a control block diagram of the power steering apparatus according to Embodiment 3 of this invention. In FIG. 8, the engine control unit ECU which controls an engine of a vehicle transmits a signal corresponding to an engine rotation number to an external signal input unit 36 provided inside the power steering control unit 3 via a communication line. The external signal input unit 36 performs input processing of an external signal input from the ECU 5, and creates a data value to be used inside the power steering control unit 3. In this Embodiment 3, the external signal input unit 36 creates an engine rotation number E_RPM from a signal corresponding to the engine rotation number input from the ECU 5.

Figure 9:
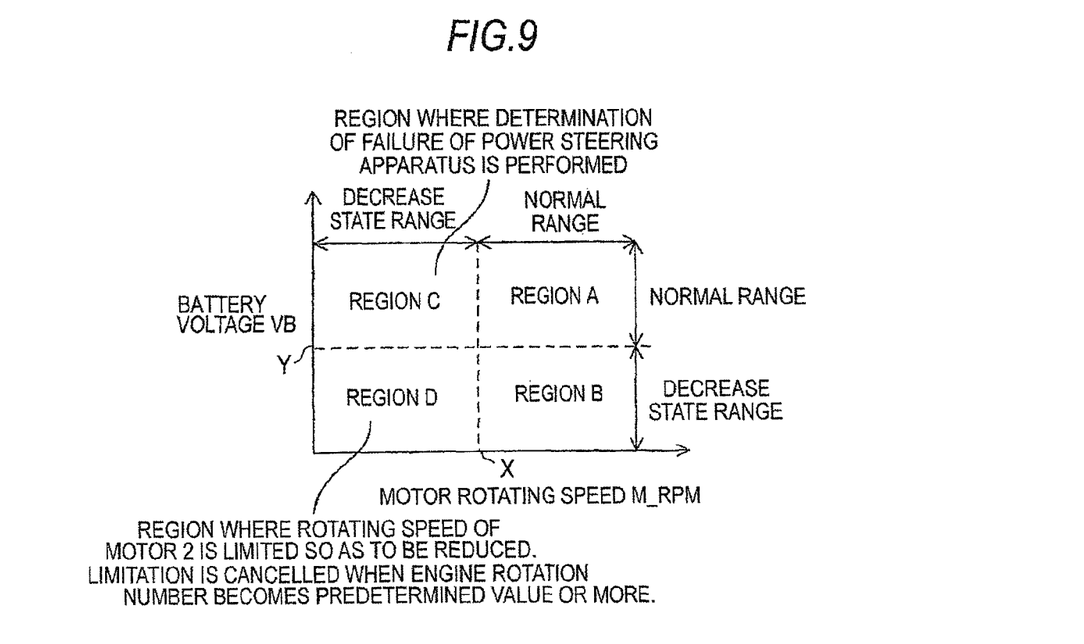
FIG. 9 is an explanatory view showing the relationship between motor rotating speed and power source voltage in the power steering apparatus according to Embodiment 3 of this invention.

FIG. 9 is an explanatory view showing the relationship between the motor rotating speed and the power source voltage in the power steering apparatus according to Embodiment 3 of this invention. Here, the horizontal axis represents the motor rotating speed M_RPM, and the vertical axis represents the power source voltage VB. In FIG. 9, the motor rotating speed M_RPM is recognized by the control stopping unit 34 and the motor output control unit 35, with a range until the motor rotating speed reaches a constant predetermined value X as a decrease state range and a range of the predetermined value X or higher as a normal range. Additionally, the power source voltage VB is recognized by the control stopping unit 34 and the motor output control unit 35, with a range until the power source voltage reaches a constant predetermined value Y as a decrease state range and a range of the predetermined value Y or higher as a normal range. In addition, the predetermined value X of the motor rotation number and the predetermined value Y of the power source voltage can be arbitrarily set, respectively.

The control stopping unit 34, similarly to the case of Embodiments 1 and 2, recognizes the motor rotating speed M_RPM and the power source voltage VB as mentioned above, respectively, and determines a region where both of the motor rotating speed M_RPM and the power source voltage VB are in the normal ranges as a "Region A", a region where the motor rotating speed M_RPM is in the normal range and the power source voltage VB is in the decrease state range as a "Region B", a region where the motor rotating speed M_RPM is in the decrease state range and the power source voltage VB is in the normal range as a "Region C", and a region where both of the motor rotating speed M_RPM and the power source voltage VB are in the decrease state ranges as a "Region D", respectively.

Here, the control stopping unit 34 obtains a region determined from the relationship between the motor rotating speed M_RPM and the power source voltage VB as the region determination result R1. The control stopping unit 34 performs the failure determination assuming that the electric power steering apparatus fails when the region determination result R1 is "Region C." Then, when the time during which the region determination result R1 of "Region C" has lasted for a predetermined time T_FAIL, the control stopping unit 34 settles the determination of the "Failure" of the power steering apparatus, and stops a power steering function.

Additionally, the motor output control unit 35, similarly to Embodiment 2, recognizes the normal ranges and the decrease state ranges as shown in FIG. 6 on the basis of the constant predetermined value X and the constant predetermined value Y, respectively, of the motor rotating speed M_RPM and the power source voltage VB. Here, similarly to the control stopping unit 34, the motor output control unit 35 obtains a region determined from the relationship between the motor rotating speed M_RPM and the power source voltage VB as the region determination result R1.

The motor output control unit 35 recognizes the motor rotating speed M_RPM and the power source voltage VB as mentioned above, respectively, and similarly to the aforementioned control stopping unit 34, determines a region where both of the motor rotating speed M_RPM and the power source voltage VB are in the normal ranges as a "Region A", a region where the motor rotating speed M_RPM is in the normal range and the power source voltage VB is in the decrease state range as a "Region B", a region where the motor rotating speed M_RPM is in the decrease state range and the power source voltage VB is in the normal range as a "Region C", and a region where both of the motor rotating speed M_RPM and the power source voltage VB are in the decrease state ranges as a "Region D", respectively. The motor output control unit 35 controls the motor driving unit 31 so as to reduce the rotating speed of the motor 2, when the region determination result R1 is in "Region D" as will be described later.

Additionally, the motor output control unit 35 cancels the limitation which has reduced the motor rotating speed, in a case where the engine rotation number E_RPM that the external signal input unit 36 has created on the basis of the signal corresponding to the engine rotation number input from the ECU 5 has become a predetermined value Z or more which will be described later.

Next, the operation of the power steering apparatus according to Embodiment 3 of this invention will be described. Since the operation when the power source voltage VB does not decrease, and the motor rotating speed M_RPM has decreased is the same as that of the FIG. 3 in the aforementioned Embodiments 1 and 2, the description thereof is omitted.

Figure 10A:
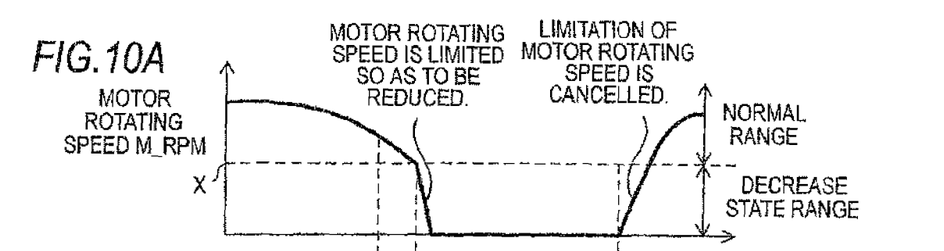
FIGS. 10A to 10D are explanatory views showing the operation when the motor rotating speed and the power source voltage have decreased, in the power steering apparatus according to Embodiment 3 of this invention.
Figure 10B:
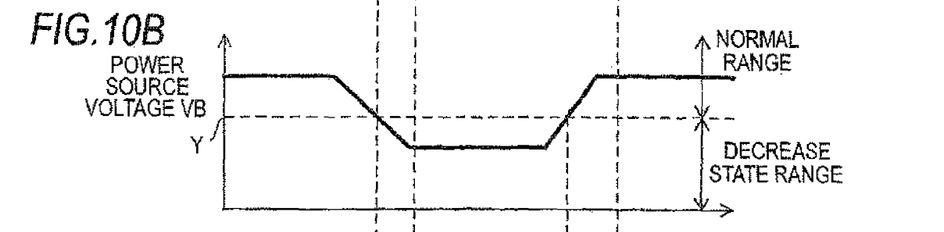
Figure 10C:
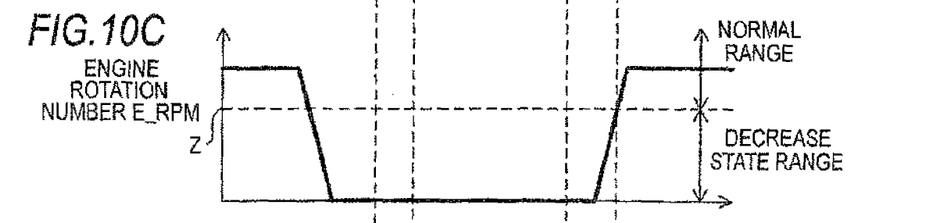
Figure 10D:
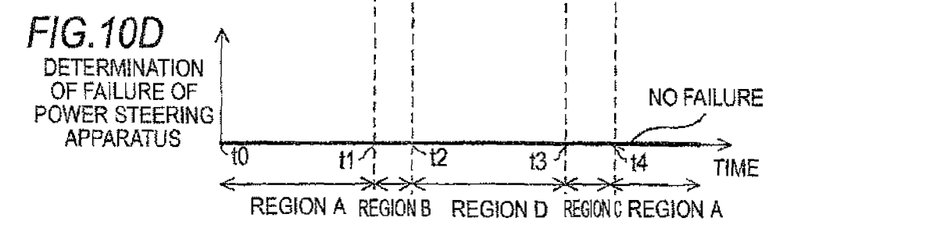

FIGS. 10A to 10D are explanatory views showing the operation when the power source voltage and the motor rotating speed have decreased in the power steering apparatus according to Embodiment 3 of this invention. Here, FIG. 10A shows the motor rotating speed M_RPM, FIG. 10B shows the power source voltage VB, FIG. 10C shows the engine rotation number E_RPM, and FIG. 10D shows a situation of determination of the failure of the power steering apparatus. Additionally, FIGS. 10A to 10D show a state where the power steering apparatus starts and the motor driving unit 31 drives the motor 2, as a starting point.

In FIGS. 10A to 10D, the motor rotating speed M_RPM exceeds the predetermined value X from a time t0 which is a starting point to a time t1. Additionally, although the power source voltage VB is a rated voltage, for example, 12 [V], and is in the normal range at the time t0, the power source voltage decreases from the rated voltage due to a certain factor immediately prior to the time t1, and becomes the predetermined value Y or less and falls into the decrease state range at the time t1. Accordingly, since both the motor rotating speed M_RPM and the power source voltage VB are in the normal ranges from the time t0 to the time t1, the region determination result R1 in the control stopping unit 34 and the motor output control unit 35 becomes "Region A."

Although the engine rotation number E_RPM exceeds the constant predetermined value Z at the point of time t0, the engine rotation number begins to decrease thereafter, and becomes "0" until the point of time t1 is reached, and remains "0" until immediately before a point of time t4 which will be described later is reached, i.e., the stopped state of the engine is continued.

At the time t1, the power source voltage VB becomes the predetermined value Y or less and falls into the decrease state range, but the motor rotating speed M_RPM exceeds the predetermined value X, and is in the normal range. Then, although the motor rotating speed M_RPM decreases gradually with a decrease of the power source voltage VB, the motor rotating speed continues to be in the normal range from the time t1 to a time t2. On the other hand, the power source voltage VB continues to be in the decrease state range from the time t1 to the time t2. Accordingly, the region determination result R1 of the control stopping unit 34 and the motor output control unit 35 from the time t1 to the time t2 becomes "Region B."

Next, when the time t2 is reached, the motor rotating speed M_RPM becomes the predetermined value X or less, and falls into the decrease state range. Additionally, even if the time t2 is reached, the power source voltage VB still continues to be in the decrease state range. Accordingly, the region determination result R1 of the control stopping unit 34 and the motor output control unit 35 from the time t2 to the time t3 becomes "Region D." As mentioned above, the motor output control unit 35 controls the motor driving unit 31 so as to reduce the rotating speed of the motor 2, when the region determination result R1 is in "Region D." Therefore, as shown in FIG. 7A, the motor 2 is controlled so that the motor rotating speed M_RPM is reduced by the motor driving unit 31 when the time t2 is reached, and the motor rotating speed becomes "0" after the elapse of the time t2. Thereafter, the motor rotating speed M_RPM remains "0" until a time t4 which will be described later is reached.

The power source voltage VB increases gradually immediately before the time t3, and exceeds the predetermined value Y and returns to the normal range when the time t3 is reached, and the power source voltage returns to the rated voltage, for example, 12 [V], when a time t4 is reached. As a result, the region determination result R1 of the control stopping unit 34 and the motor output control unit 35 from the time t3 to the time t4 changes to "Region C" from "Region D."

The engine is restarted immediately before the point of time t4, and the engine rotation number E_RPM begins to increase from that point of time, becomes the predetermined value Z or more at the point of time t4, and then returns to a constant rotation number. The motor output control unit 35 recognizes that the engine rotation number E_RPM is in the decrease state range when the engine rotation number is less than the predetermined value Z, and recognizes that the engine rotation number is in the normal range when the engine rotation number becomes the predetermined value Z or more. The motor output control unit 35 also controls the motor driving unit 31 so as to cancel the limitation of the motor rotating speed at the point of time t4 when the motor output control unit has recognized that the engine rotation number E_RPM has changed to the normal range from the decrease state range. Accordingly, the motor rotating speed M_RPM increases gradually from the time t4, becomes the predetermined value X or more after the elapse of the time t4, and returns to the normal range.

The region determination result R1 of the control stopping unit 34 and the motor output control unit 35 becomes "Region C" from the time t3 to the time t4. The control stopping unit 34 measures the period during which the region determination result R1 of "Region C" lasts from the time t3 when the determination result becomes "Region C." However, the period from the time t3 to the time t4 is less than the predetermined time T_FAIL. Accordingly, the determination of the "Failure" of the power steering apparatus is not settled. Accordingly, as shown in FIG. 4C, the failure determination of the power steering apparatus by the control stopping unit 34 remains "No Failure."

After the time t4, both the motor rotating speed M_RPM and the power source voltage VB are in the normal ranges, and the region determination result R1 by the control stopping unit 34 and the motor output control unit 35 becomes "Region A." As the region determination result. R1 becomes "Region A" from "Region C", it is possible to perform the normal operation of the power steering apparatus.

In addition, in order not to settle the failure of the power steering apparatus during starting of the motor 2, the aforementioned predetermined time T_FAIL may be set to a larger value than the period until the motor rotating speed M_RPM reaches the normal range from "0" when the motor 2 has been driven with the power source voltage VB being in the normal range.

Additionally, in the aforementioned description, the control stopping unit 34 performs the determination of the normal range and decrease state range of the power source voltage VB and motor rotating speed M_RPM, on the basis of the constant predetermined value Y and the constant predetermined value X, respectively. However, a hysteresis may be given to the respective predetermined values Y and X so that chattering does not occur before or after the determination.

In addition, in the aforementioned Embodiments 2 and 3, the motor rotating speed is reduced to "0" when the region determination result R1 is "Region D." However, the motor rotating speed may be limited to a larger predetermined rotating speed than "0."

Additionally, in the aforementioned Embodiments 2 and 3, the motor rotating speed M_RPM is reduced immediately when the region determination result R1 is "Region D." However, the motor rotating speed may be reduced after the elapse of a predetermined time.

Moreover, in the aforementioned Embodiments 2 and 3, determination of the failure of the power steering apparatus is performed when the region determination result R1 is Region C. However, the determination of the failure of the power steering apparatus may not be performed in a case where the motor output control unit 35 is in a state where the output is limited.

Various modifications and alterations of this invention will be apparent to those skilled in the art without departing from the scope and spirit of this invention, and it should be understood that this is not limited to the illustrative embodiments set forth herein.

What is claimed is:

1. A power steering apparatus with a power steering function to drive an oil pump by a motor to generate hydraulic pressure, and to assist in driver's steering through the hydraulic pressure, the power steering apparatus comprising:
a power source voltage detecting means which detects the voltage of a power source of the power steering apparatus;
a motor rotating speed detecting means which detects the rotating speed of the motor; and
a control stopping means which stops the power steering function when the voltage of the power source detected by the power source voltage detecting means exceeds a predetermined power source voltage value, and the rotating speed of the motor detected by the motor rotating speed detecting means is equal to or less than a predetermined motor rotating speed value.

2. The power steering apparatus according to claim 1, wherein the stop of the power steering function by the control stopping means is performed after the rotating speed of the motor detected by the motor rotating speed detecting means becomes equal to or less than the predetermined motor rotating speed value and then a predetermined time has elapsed.

3. The power steering apparatus according to claim 1, wherein the control stopping means makes driving of the motor continue when the voltage of the power source detected by the power source voltage detecting means is equal to or less than the predetermined power source voltage value, and the rotating speed of the motor detected by the motor rotating speed detecting means is equal to or less than the predetermined motor rotating speed value.

4. The power steering apparatus according to claim 1, further comprising a motor output control means which controls the output of the motor,
wherein the motor output control means reduces the output of the motor when the voltage of the power source detected by the power source voltage detecting means is equal to or less than the predetermined power source voltage value, and the rotating speed of the motor detected by the motor rotating speed detecting means is equal to or less than the predetermined motor rotating speed value, and cancels the reduction of the output of the motor when the voltage of the power source exceeds the predetermined power source voltage value.

5. The power steering apparatus according to claim 1, further comprising a motor output control means which controls the output of the motor, and an external signal input means which inputs a signal from the outside,
wherein the motor output control means reduces the output of the motor when the voltage of the power source detected by the power source voltage detecting means is equal to or less than the predetermined power source voltage value, and the rotating speed of the motor detected by the motor rotating speed detecting means is equal to or less than the predetermined motor rotating speed value, and cancels the reduction of the output of the motor on the basis of a signal from the outside input into the external signal input means.

6. The power steering apparatus according to claim 1, wherein the control stopping means stops the driving of the motor, thereby stopping the power steering function.

7. A power steering apparatus with a power steering function to drive an oil pump by a motor to generate hydraulic pressure, and to assist in driver's steering through the hydraulic pressure, the power steering apparatus comprising:
a power source voltage detecting means which detects the voltage of a power source of the power steering apparatus;
a motor rotating speed detecting means which detects the rotating speed of the motor; and
a control stopping means which recognizes that the voltage of the power source is in a normal range when the voltage of the power source detected by the power source voltage detecting means exceeds the predetermined power source voltage value, and recognizes that the voltage of the power source is in a decrease state range when the voltage of the power source is equal to or less than the predetermined power source voltage value; recognizes that the motor rotating speed is in a normal range when the rotating speed of the motor detected by the motor rotating speed detecting means exceeds the predetermined motor rotating speed value, and recognizes that the motor rotating speed is in a decrease state range when the rotating speed of the motor is equal to or less than the predetermined motor rotating speed value; determines that the power steering apparatus fails when it is recognized that the power source voltage is in the normal range, and the motor rotating speed is in the decrease state range; and stops the power steering function when the determination lasts for a predetermined time.

8. The power steering apparatus according to claim 7, wherein the control stopping means stops the driving of the motor, thereby stopping the power steering function.

* * * * *